(12) United States Patent
Hayward et al.

(10) Patent No.: US 10,072,768 B1
(45) Date of Patent: Sep. 11, 2018

(54) THERMO-STRATIFIED, PASSIVE-COOLED SERVO VALVE

(71) Applicant: JANSEN'S AIRCRAFT SYSTEMS CONTROLS, INC., Tempe, AZ (US)

(72) Inventors: David G Hayward, Scottsdale, AZ (US); Douglas W Knight, Scottsdale, AZ (US); Jerame J Powell, Laveen, AZ (US); Kevin W Deutscher, Phoenix, AZ (US)

(73) Assignee: JANSEN'S AIRCRAFT CONTROLS SYSTEMS, INC., Tempe, AZ (US)

( * ) Notice: Subject to any disclaimer, the term of this patent is extended or adjusted under 35 U.S.C. 154(b) by 76 days.

(21) Appl. No.: 15/185,811

(22) Filed: Jun. 17, 2016

Related U.S. Application Data

(60) Provisional application No. 62/181,346, filed on Jun. 18, 2015.

(51) Int. Cl.
*F16K 27/04* (2006.01)
*F16K 31/06* (2006.01)

(52) U.S. Cl.
CPC ........ *F16K 27/048* (2013.01); *F16K 31/0644* (2013.01)

(58) Field of Classification Search
CPC .... F16K 27/048; F16K 31/0644; F16K 49/00; Y10T 137/6525
USPC .......................................... 137/338; 335/300
See application file for complete search history.

(56) References Cited

U.S. PATENT DOCUMENTS

| | | | | |
|---|---|---|---|---|
| 1,944,113 A | * | 1/1934 | Shenton | F16K 31/0655 137/338 |
| 3,818,398 A | * | 6/1974 | Barbier | H01F 7/1607 251/30.03 |
| 4,850,425 A | * | 7/1989 | Anderson | B29B 13/022 165/65 |
| H1191 H | * | 6/1993 | Hutchison | 137/625.65 |
| 5,375,738 A | * | 12/1994 | Walsh | B05C 5/001 222/1 |
| 5,535,919 A | * | 7/1996 | Ganzer | B05C 5/001 222/1 |
| 6,427,970 B1 | * | 8/2002 | Silva | F15B 13/0402 137/338 |
| 6,918,569 B2 | | 7/2005 | Jansen | |
| 7,004,449 B2 | | 2/2006 | Jansen | |
| 7,137,613 B2 | | 11/2006 | Jansen | |
| 8,226,359 B1 | | 6/2012 | Jansen et al. | |

(Continued)

*Primary Examiner* — Eric Keasel
(74) *Attorney, Agent, or Firm* — Klintworth & Rozenblat IP LLP; Steven J. Wietrzny

(57) ABSTRACT

A servo valve has a heatsink housing with a plurality of external fins. The heatsink housing contains an electromagnet arrangement and a valve arrangement. The electromagnet arrangement has a magnet assembly, a coil assembly, pole pieces, and an armature acted upon by flux generated by the electromagnet. A conductive support member connects the coil assembly to the heatsink housing. The valve arrangement has a valve member driven by the armature to control flow between an inlet port and an outlet port. The valve arrangement is positioned in the heatsink housing on an opposite side of a seal plate from the electromagnet arrangement. The support member holds the coil assembly spaced from the seal plate and in a thermally conductive path to the heatsink housing.

19 Claims, 7 Drawing Sheets

(56) References Cited

U.S. PATENT DOCUMENTS 8,474,660 B2 *  7/2013  Frates ................... B05C 5/0237
                                                     222/146.2

* cited by examiner

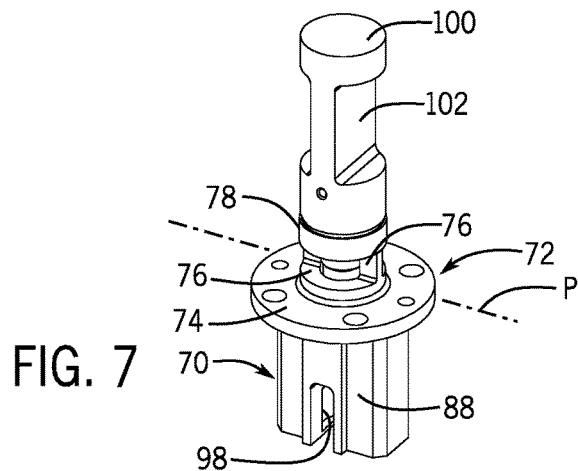
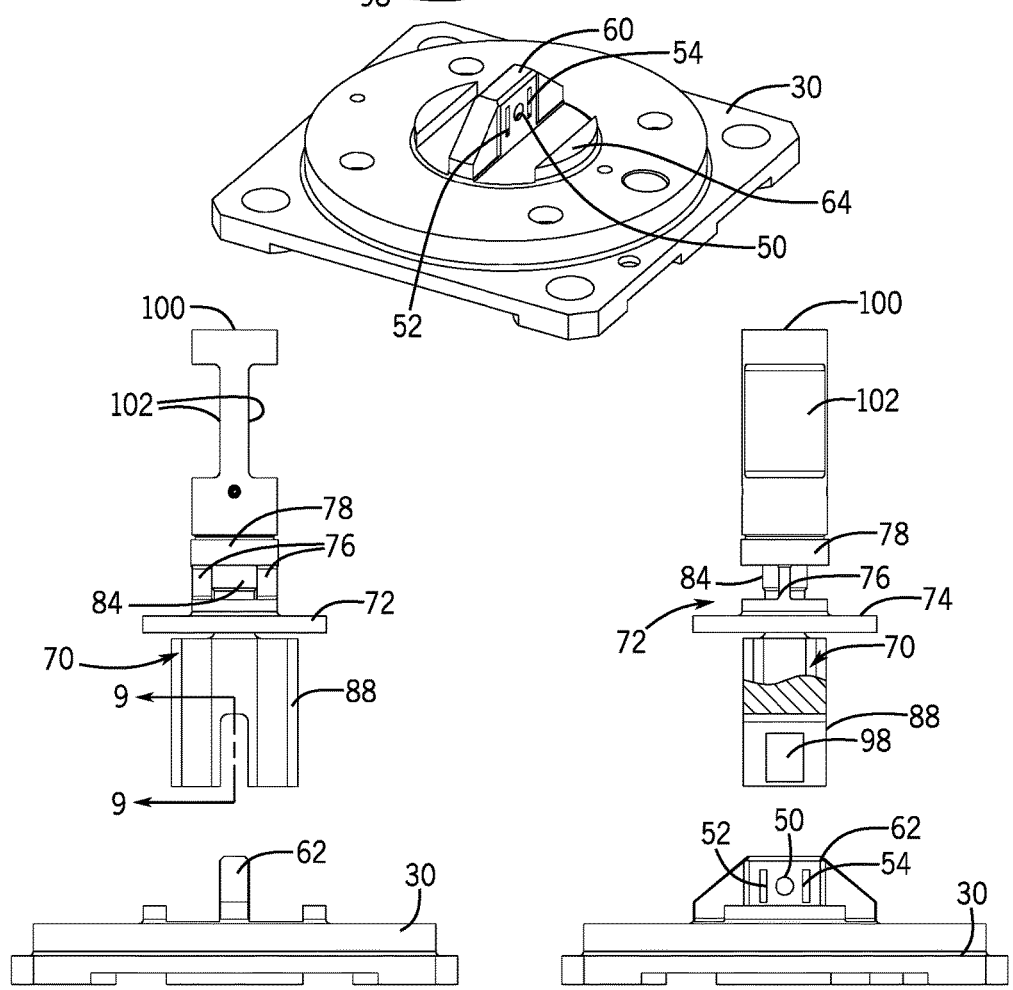
FIG. 7
FIG. 8
FIG. 9

THERMO-STRATIFIED, PASSIVE-COOLED SERVO VALVE

CROSS-REFERENCE TO RELATED APPLICATION(S)

This application claims priority to U.S. Provisional Application No. 62/181,346 filed Jun. 18, 2015.

STATEMENT OF FEDERALLY SPONSORED RESEARCH OR DEVELOPMENT

Not applicable.

FIELD OF THE DISCLOSURE

This disclosure relates to servo valves, and in particular to passively cooled servo valves.

BACKGROUND OF THE DISCLOSURE

Servo valves are used in various applications for precision control of gas and liquid media flow, such as in the air and space industries to control various intake and exhaust flow streams to and from various pressure and flow control components. For example, servo valves are used to control flow to auxiliary power units and other subsystems in air and space flight vehicles. One example aircraft application uses one or more servo valves to route compressor discharge air from the turbine engines to the wings for inflight de-icing. The servo valves must withstand the high-vibration and high-temperature conditions associated with components mounted at or near the engines during flight. The high vibrations encountered in this application (and others) can disrupt proper operation of the valve member, and thereby hamper valve performance. The heat encountered can render torque motor drives unsuitable, or can significantly shorten their useful life. Active cooling systems may introduce unwanted reliability concerns or add weight and size unsuitable for the limited weight and space envelope requirements common in flight vehicles.

SUMMARY OF THE DISCLOSURE

The disclosure provides a servo valve with improved thermal and vibration handling characteristics.

One aspect the disclosure provides a servo valve that has a heatsink housing with a plurality of external fins and defining an internal chamber. An electromagnet arrangement is disposed within the internal chamber and generates a flux field. The electromagnet arrangement has a magnet assembly, a coil assembly, pole pieces, a seal plate spaced from the coil assembly, and an armature acted upon by the flux field. A conductive support member connects the coil assembly to the heatsink housing. A valve arrangement is disposed within the internal chamber at a side of the seal plate opposite the electromagnet arrangement and has a valve member driven by the armature to control flow between an inlet port and an outlet port.

Another aspect the disclosure provides a servo valve having a heatsink housing with a plurality of external fins and defining an internal chamber. An electromagnet arrangement is disposed within the internal chamber and generates a flux field. The electromagnet arrangement has a magnet assembly, a coil assembly, pole pieces, a seal plate spaced from the coil assembly, and an armature acted upon by the flux field. A valve arrangement is disposed within the internal chamber at a side of the seal plate opposite the electromagnet arrangement and has a valve member driven by the armature to control flow between an inlet port and an outlet port. A support member connects the coil assembly to the heatsink housing and has a higher thermal conductivity than the valve arrangement.

Another aspect the disclosure provides a servo valve having a heatsink housing with a plurality of external fins and defining an internal chamber. An electromagnet arrangement is disposed within the internal chamber and generates a flux field. The electromagnet arrangement has a magnet assembly, a coil assembly, pole pieces, a seal plate spaced from the coil assembly, and an armature acted upon by the flux field. A conductive support member connects the coil assembly to the heatsink housing. A valve arrangement is disposed within the internal chamber and has a valve member driven by the armature to control flow between an inlet port and an outlet port at an interface between the valve member and a valve seat. The valve seat is defined by a base disposed at an end of the heatsink housing opposite to where the support member connects. The valve member is configured to contain a majority of the flow at the interface between the valve member and the valve seat.

The details of one or more embodiments are set forth in the accompanying drawings and the description below. Other features and advantages will become apparent from the description, the drawings, and the claims.

BRIEF DESCRIPTION OF THE DRAWINGS

FIGS. 6A-6C are enlarged detail views showing a valve member of the servo valve of FIG. 1 in three different positions;

FIG. 7 is an exploded perspective view of certain components of the valve arrangement of the servo valve of FIG. 1;

FIG. 8 is an elevational view thereof;

FIG. 9 is an elevational cut-away view thereof as viewed from the plane 9-9 of FIG. 8;

FIG. 12 is a perspective view of an example bobbin with an integrally formed support for mechanically and thermally coupling a wire coil of the electromagnet to a housing of the servo valve of FIG. 1.

Like reference symbols in the various drawings indicate like elements.

DETAILED DESCRIPTION

Figure 1A:
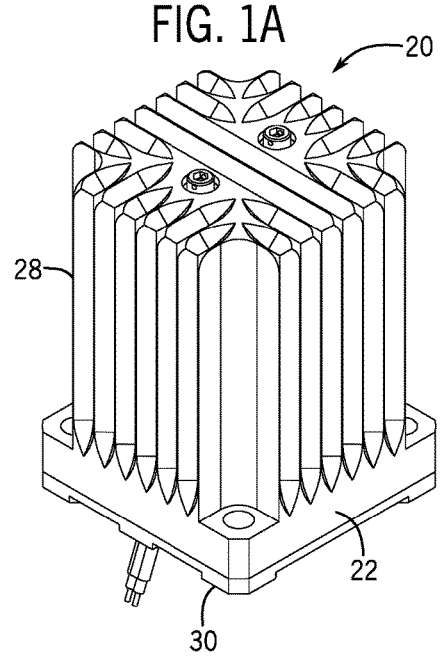
FIGS. 1A and 1B are respective top and bottom perspective views of an example servo valve according to this disclosure.

The following describes one or more example embodiments of the disclosed servo valve, as shown in the accompanying figures of the drawings described briefly above.

Various modifications to the example embodiments may be contemplated by one of skill in the art.

The term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Servo valves are used in a wide variety of industries for varied applications. As mentioned, servo valves are used in the air and space industries for controlling flow of media streams to and from various components (e.g., engines, auxiliary power units, and so on). One example application for servo valves in this context is to control the routing of hot exhaust air from the aircraft engines to de-ice the wings during flight. One or more servo valves can be mounted either directly to each engine, its compressor or to a manifold valve (e.g., a butterfly valve) that controls bulk flow direction to the wings. In any case, the servo valves may be subjected to excessive temperatures (e.g., about 350-1,000° F.) and high random vibration (e.g., about 100 GRMS and 10-2,000 Hz frequency and amplitude). Despite this, to operate in a suitably reliable manner for this application, the servo valve should exhibit consistent flow within a narrow flow band (e.g., about 1-10 CFM) during operation. The thermal and mechanical characteristics (e.g., coefficient of thermal expansion (CTE), center of mass, etc) of the operating components of the servo valve can be significant factors in determining whether the servo valve will meet the stability and responsiveness demands of such applications. Thus, the proper design of the servo valve may be of paramount importance in certain applications.

A servo valve is disclosed herein that is suitable for use in flight applications of this nature. The disclosed servo valve has thermal and vibration characteristics that enable it to exhibit stabile flow in such applications. Various components of the servo valve are arranged, configured and composed of materials in a manner that limits the migration of heat from the controlled flow to components that are more sensitive to thermal breakdown. Various components of the servo valve are also arranged, configured and composed of materials in a manner that improves heat extraction via conduction and radiation. Various components of the servo valve are also arranged, configured and composed of materials in a manner that gives the servo valve mechanical properties better equipped to operate in high vibration environments.

In certain embodiments, for example, the servo valve has a heatsink housing or cap that encloses the working valve components and has various characteristics that passively extract heat from the valve components. The heatsink housing may be made of a thermally conductive material (e.g., aluminum) and mechanically tie into certain valve components to conduct heat toward the heatsink housing. The exterior of the heat sink housing may be black in color (and thus have a high emissivity value) and multiple external fins that are configured and arranged to avoid entrapping emitted radiation, and thereby improve radiative cooling of the servo valve.

In certain embodiments, the internal components of the servo valve are arranged to effect a stratified thermal gradient in which heat from the controlled flow is contained in a selected region of the servo valve. For example, the controlled flow may be directed through a valve seat at an area of the valve that is physically separated from certain components of the servo valve. In one embodiment, the valve seat is located at one end of the heatsink housing opposite from where the torque motor, more specifically the electromagnet, and even more specifically the coil assembly thereof, is mounted. The valve member is configured to contain the controlled flow primarily to the interface between the valve member and the valve seat. Static pressure head within the heatsink housing limits circulation of any leakage beyond the valve seat, thereby limiting thermal conduction from any flow that should leak past the valve member. Thermal conduction from the valve seat to the torque motor components is also reduced by a combination of materials exhibiting relatively low conductivity and packaging the components in a manner that tends to thermally isolate the coil assembly.

In certain embodiments, an air gap is maintained between the electromagnet coil assembly and other thermally conductive components of the torque motor or valve arrangement in physical contact with (i.e., thermally conductive relation to) the valve seat carrying the hot flow. A support member may mount the coil assembly to the heatsink housing to both maintain the isolating air gap as well as create a direct thermal conduction path to the heatsink housing. In one example, the support member is an elongated extension formed as an integral part of the coil bobbin. The bobbin, and thus the support member, may be made of aluminum or other material having high thermal conductivity. Thus, the servo valve is designed to reduce adverse effects of elevated temperatures on the torque motor by segregating the heat input from the controlled flow, physically isolating the coil assembly from the valve seat, and providing a direct tie to the heatsink housing to cool the coil assembly through conductive and radiative heat transfer.

In certain embodiments, the servo valve also exhibits accurate flow control response in high vibration environments. In some embodiments, the valve member is a pressure-balanced clevis. The clevis may be directly coupled to the electromagnet armature, such as by a threaded connection with or without an additional pin connection that prevents separation of the threads by inhibiting relative rotational and axial movement of the clevis. In some embodiments, the armature and valve member (e.g., clevis) coupling has a center of mass located to intersect with an axis along which the clevis pivots when controlling flow passing through the valve seat. The armature and clevis coupling is thus mechanically balanced about the pivot axis. In one example, the armature is configured to have the mass necessary to locate the center of mass at the pivot axis by having one or more hollows or notches formed in an otherwise cylindrical body of the armature.

Figure 1B:
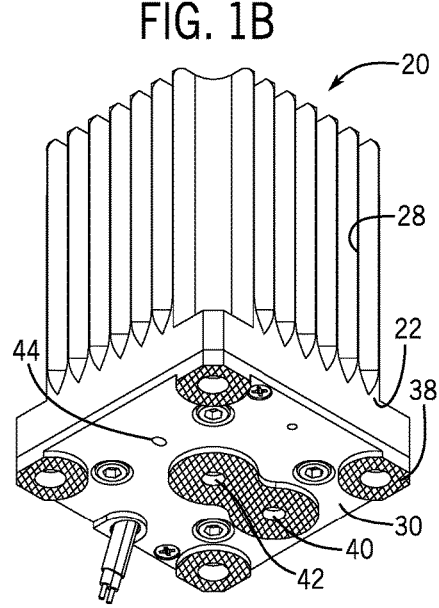
Figure 2:
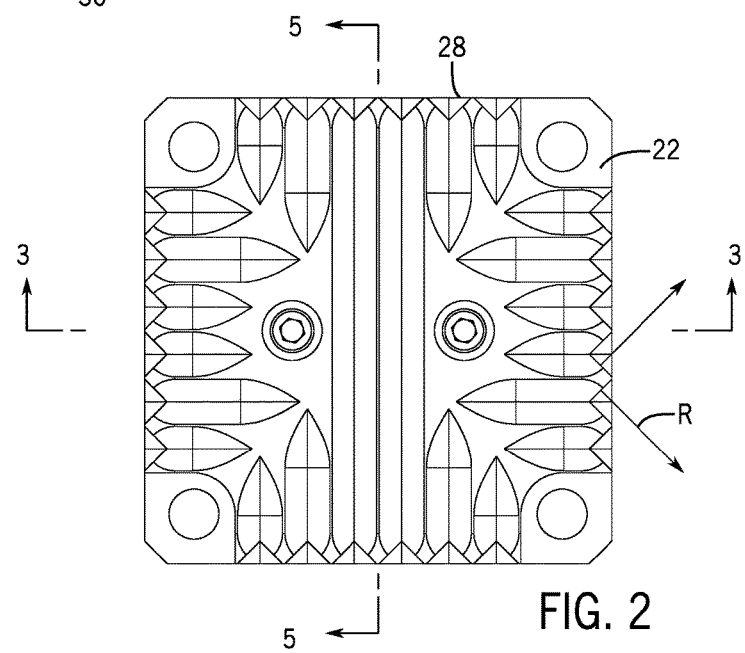
FIG. 2 is a top plan view thereof.
Figure 3:
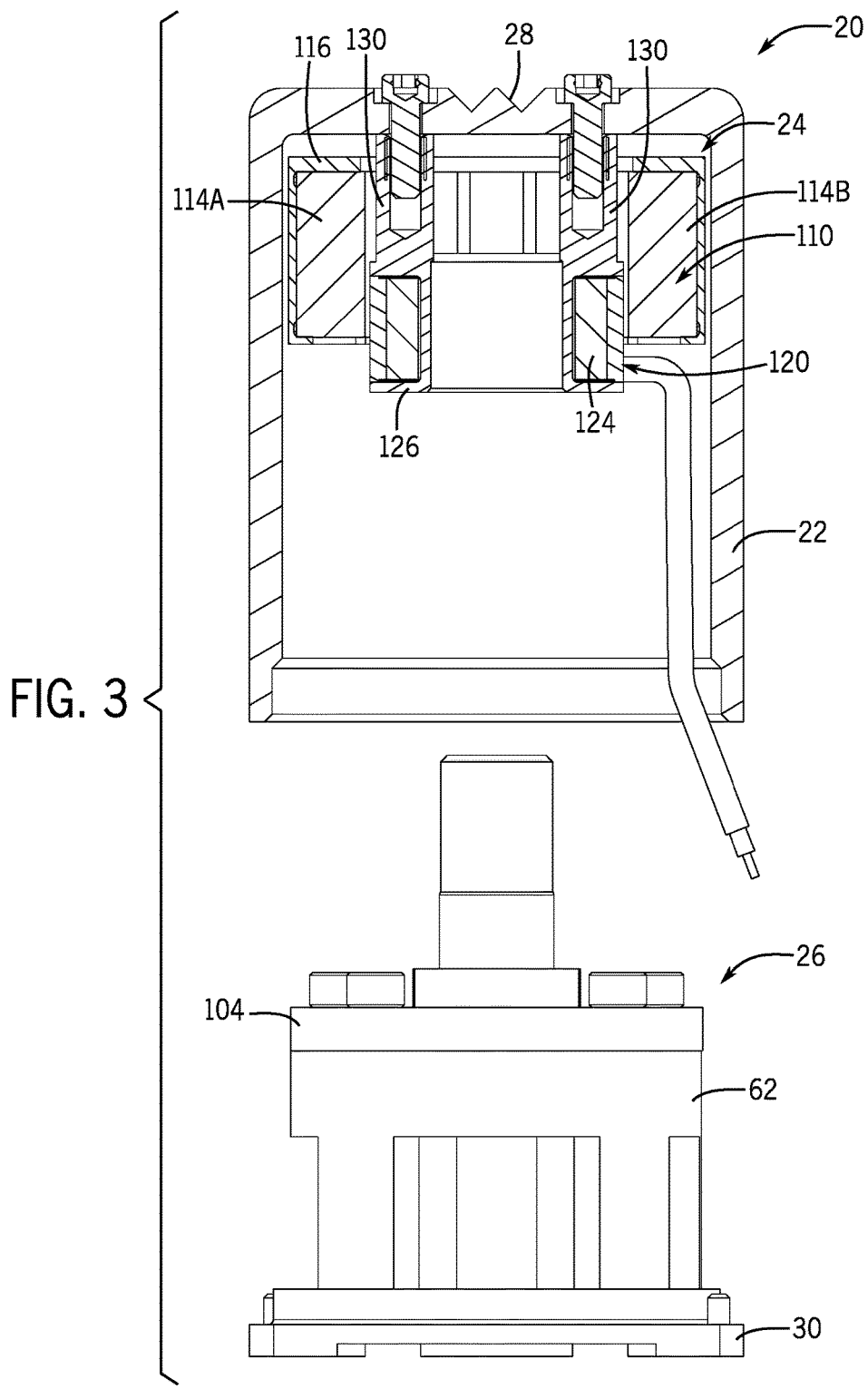
FIG. 3 is an exploded sectional view taken along plane 3-3 of FIG. 2.

Having described some of the benefits of the disclosed servo valve, one or more specific example embodiments will now be detailed of a servo valve for use in high temperature and vibration environments, such as air and space flight vehicles. Referring to FIGS. 1-3, a servo valve 20 includes a heatsink housing 22 defining an internal volume housing a torque motor 24 and a valve arrangement 26. Generally, the thermal profile of the servo valve 20 is stratified, that is it exhibits a thermal gradient that decreases from the end at which the valve arrangement 26 is mounted to the end at which the torque motor 24 is mounted. The configuration and material selection of the valve arrangement 26 tends to mitigate heat migration (principally from thermal conduction) from the fluid (e.g., hot air) being controlled and the configuration and material selection of the torque motor 24 and the heatsink housing 22 tends to promote heat extraction from the servo valve 20, in particular the torque motor 24 (and especially the coil assembly thereof), to ambient.

The heatsink housing 22 serves the dual purpose of containing the internal components of the servo valve 20 and collecting and extracting heat therefrom. In the illustrated example, the heatsink housing 22 has a plurality of fins 28, or areas of increased surface area from which to emit thermal radiation. The fins 28 may be aligned in parallel from top to bottom on each of the four sides as well as at the top of the heatsink housing 22. The fins 28 may be machined or otherwise formed into the heatsink housing 22 and configured so that their surfaces are arranged in intersecting planes that define included angles of 90 degrees with respect to adjacent fins 28. Since thermal radiation is emitted at right angles (see arrows R in FIG. 2) to the emitting surface of the fins 28, the radiation is free to pass into the ambient (cooler) air surrounding the servo valve 20 without impediment or being redirected back toward the servo valve 20. This, and coloring the exterior surface of the heatsink housing 22 black, enhances the emissivity value of the heatsink housing 22, and thereby the thermal radiation and in turn the passive cooling capacity of the heatsink housing 22.

The heatsink housing 22 mounts to a base 30 so as to enclose the torque motor 24 and the valve arrangement 26. The base 30 is formed with flow passages that serve as the input/output interface for the controlled flow. Specifically, in the illustrated example, the base 30 defines a source (or inlet) passage 32, a control (or inlet/outlet) passage 34 and a vent (or outlet) passage 36, although, it will be understood that the flow passages may vary both in terms of assignment and quantity. As shown in FIG. 1B, the underside of the base 30 has raised (or from the perspective of FIG. 1B downwardly extending) contact pads 38 that physically contact the mating component (e.g., a manifold valve (not shown) in the case of an aircraft wing de-icing application). The undersides of the contact pads 38 may be roughed, grooved or themselves have raised surfaces, as shown. The contact pads 38, and their underside geometry, reduce the surface area of the base 30 that contacts the mating component, thereby reducing heat transfer by thermal conduction. In the illustrated example, contact pads 38 are arranged at the four corners of the base 30 for mounting bolts (not shown) to tie the servo valve 20 to the mating component. The base 30 has one or more contact pads 38 surrounding openings 40 and 42 to the pressurized flow passages 32 and 34, respectively, which, depending on the operational state of the servo valve 20, may input or output controlled flow. The base 30 does not have a contact pad at an opening 44 to the flow passage 36, which acts only as a vent, and thus permits vented flow to flow from the underside of the base 30 to ambient. It should be noted that the contact pads 38 surrounding the flow passages 32, 34 may provide a metal to metal seal with the mating component or seal by way of an O-ring, gasket or other suitable seal material interposed between the base 30 and the mating component, with flats or grooves being formed in the associated contact pads 38 (or the mating component) as needed.

Figure 5:
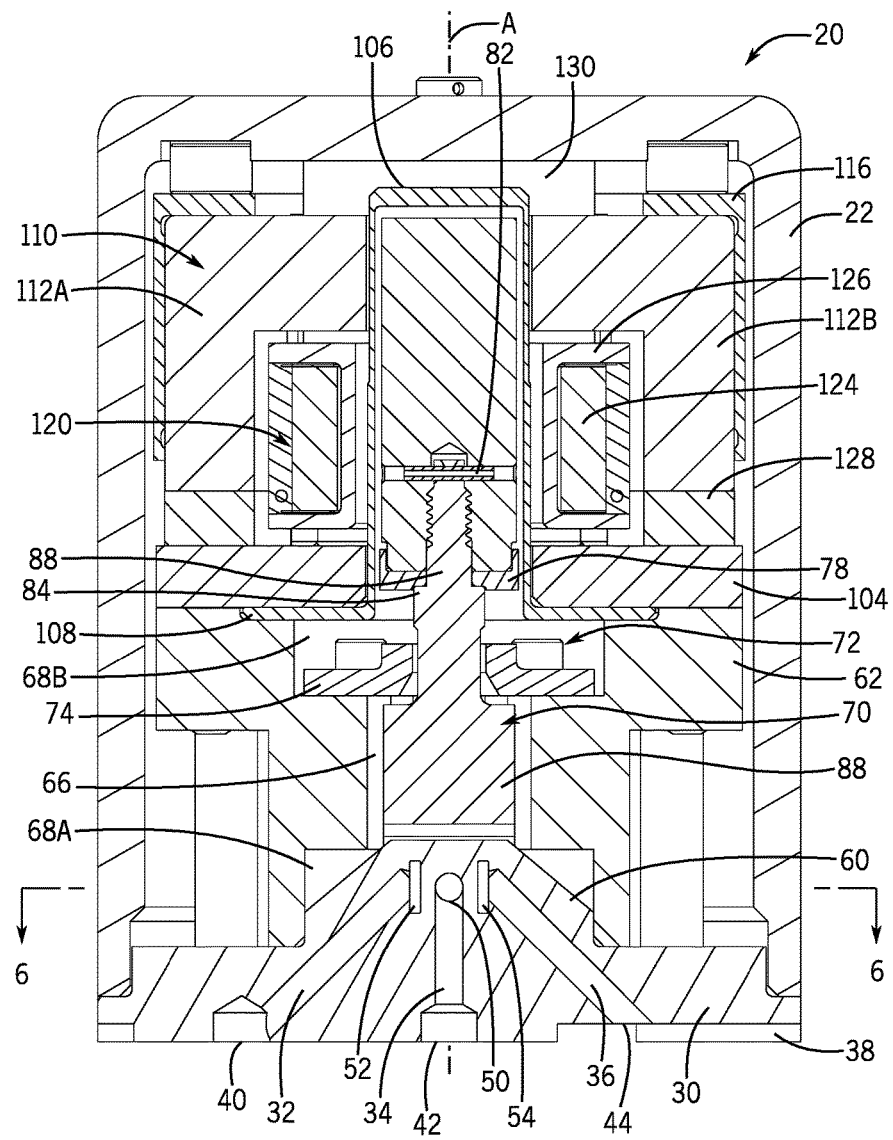
FIG. 5 is a sectional view taken along plane 5-5 of FIG. 2.

Referring also to FIGS. 5 and 7, the flow passage 34 extends from the opening 42 to an opening 50 at each metering face of a valve seat 60 extending from an upper surface of the base 30. The flow passages 32 and 36 extend from the associated opening 40, 44 to metering ports 52, 54, which are spaced on opposite sides of the openings 50 at each metering face of the valve seat 60. In the example embodiment, the metering ports 52, 54 are generally rectangular slots, which aids in linearizing the flow profile during metering, however, other non-rectangular port configurations may be suitable. An internal valve housing 62 mounts to the base 30, centering thereon by guides 64 extending from the upper surface of the base 30. The valve housing 62 supports a valve member 70, which in the illustrated example is a flexure pivot clevis valve described in detail below, although it could be another suitable valve configuration. The valve housing 62 defines an annular cavity generally concentric with a valve axis A. The cavity is open-ended axially and defines a narrowed neck 66 and enlarged lower and upper pocket 68A, 68B, the lower pocket 68A accommodating the raised valve seat 60 and the upper pocket 68B accommodating the flexure pivot for the valve member 70.

Figure 4:
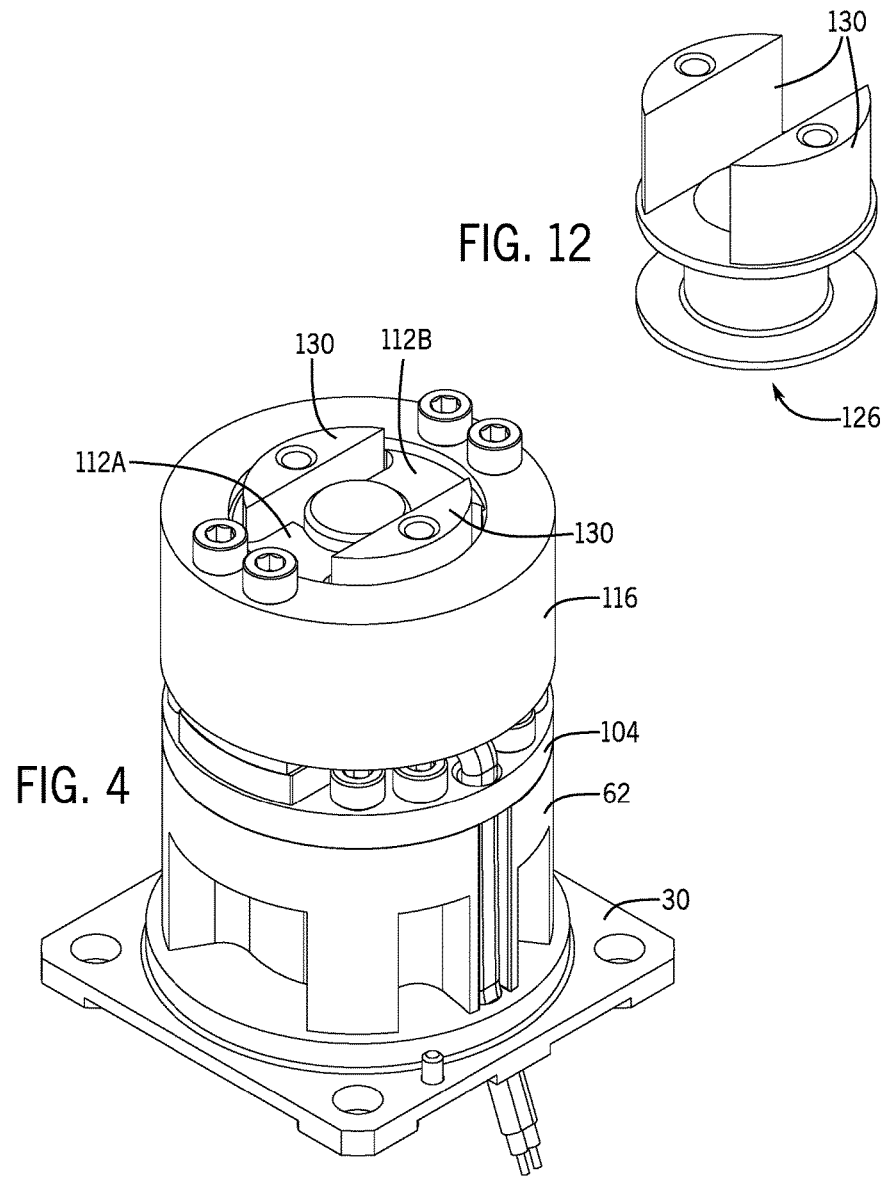
FIG. 4 is a perspective view of the internal components of the servo valve of FIG. 1A.

As mentioned, the valve member 70 is shown as a flexure pivot clevis valve. Referring also to FIGS. 8 and 9, the example clevis 70 includes a flexure pivot 72 with an annular base 74 and a pair of upstanding flexible struts 76 that flexibly couple the annular base 74 to a smaller annular plate 78. The annular base 74 bolts to the valve housing 62, as shown in FIGS. 3-5. The annular plate 78 connects to an armature 100 of the electromagnetic torque motor 24 in a suitable manner. In the illustrated example, the annular plate 78 and the armature 100 are coupled by the connection of the clevis 70 and the armature 100, specifically, engagement of threads on a stem 80 of the clevis 70 and a threaded opening in the armature 100. The stem 80 may also be tied to the armature 100 by a pin 82 disposed in aligned openings through the stem 80 and the armature 100. The stem 80 may have a reduced diameter at the threaded end and form a shoulder 84, which clamps the annular plate 78 against the armature 100. The armature 100 may have a reduced diameter end that fits into a recessed upper end of the annular plate 78. The valve stem 80 fits through the center of the annular base 74 and extends to an enlarged head 88. The head 88 of the clevis 70 is forked to form two spaced apart head sections, one on each side of a gap that accommodates the valve seat 60. Each section of the head 88 has an open area separating two metering edges 94A, 94B. The open areas may be any suitable configuration including the same or different volume rectilinear channels or arcuate grooves with open or closed ends. In the illustrated example, the open areas are substantially identical arcuate grooves 98 with closed upper and lower ends. Since the porting (i.e., flow areas) in the valve seat 60 (and the two head sections) are also substantially identical at both metering faces, both head sections realize substantially equal pressure, and thus the clevis 70 is pressure-balanced, which means that zero or near zero net pressures forces act on the clevis 70 during operation, thus giving the servo valve 20 scalability and consistent operation over a wide range of working pressures. Moreover, the configuration of the clevis 70 provides a physical barrier and flow path for largely containing the controlled flow at all sides to the interface of the valve seat 62 and the clevis 70 during operation, thereby minimizing the thermal impact of the flow on the servo valve 20, as discussed below. Further, as shown in FIGS. 7-9, the armature 100 has notched areas 102 at opposite sides of the axis A. The size and location of the notches 102 are selected to locate the center of mass of the armature-clevis coupling so as to intersect with a pivot axis P of the flexure pivot 72. This has the effect of balancing mechanically the armature-clevis coupling so that it is less susceptible to vibration-induced variation in clevis position during operation of the servo valve 20.

Precise control of the flow through the valve seat 60 as well as substantial containment of the flow may be achieved by providing close tolerances in the spacing between the metering edges 94A, 94B of the clevis 70 and between the metering faces of the valve seat 60 and the two head sections of the clevis 70. Since the metering edges 94A, 94B are at the inner edges of the head 88, their spacing can be controlled by precise machining or other precise operation forming the grooves 98, and if necessary, the port gaps themselves. Control of the gaps at the metering faces of the valve seat 60 may be controlled by precise machining or other precise operation to the metering faces, and thereby to precisely control the width of the valve seat 60.

Figure 10:
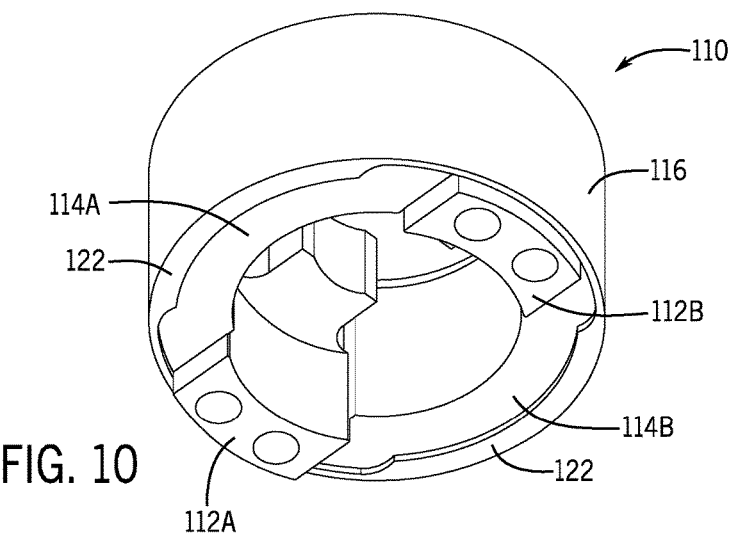
FIG. 10 is a perspective view of a magnet assembly in an electromagnetic torque motor of the servo valve of FIG. 1.

Referring again to FIG. 5, the valve housing 62 supports the torque motor 24 by direct contact with a seal plate 104. As mentioned, in the illustrated example, the torque motor 24 is an electromagnet that, in addition to the armature 100, includes a magnet assembly 110 and a coil assembly 120 which work together to move the armature 100 off of the valve axis A, and thereby pivot the clevis 70 about the pivot axis P. More specifically, the magnet assembly 110 includes a pair of pole pieces 112A, 112B and a set of magnets, such as the two arcuate magnets 114A, 114B shown in FIG. 10. Additional magnets (e.g., two sets of two) may be used in other embodiments. The pole pieces 112A, 112B and the magnets 114A, 114B are retained and assembled by a shell 116. The shell 116, configured as disclosed herein, allows the pole pieces 112A, 112B and magnets 114A, 114B to be held in close abutting relation without the need for a separate connection technique being applied. In addition to reducing the cost and complexity of assembly, this has operational benefits over conventional assemblies. For example, conventional low temperature soldering and brazing techniques are unable to provide a reliable fused joint capable of withstanding the high temperatures that may be encountered in air and space flight vehicle applications. Even if a high temperature brazing technique was used, the elevated temperatures required to achieve a sufficient bond may alter the magnetic properties of the pole pieces 112A, 112B and/or the magnets 114A, 114B. The disclosed arrangement thus avoids the problems associated with conventional techniques.

Figures 11A, 11B, 11C:
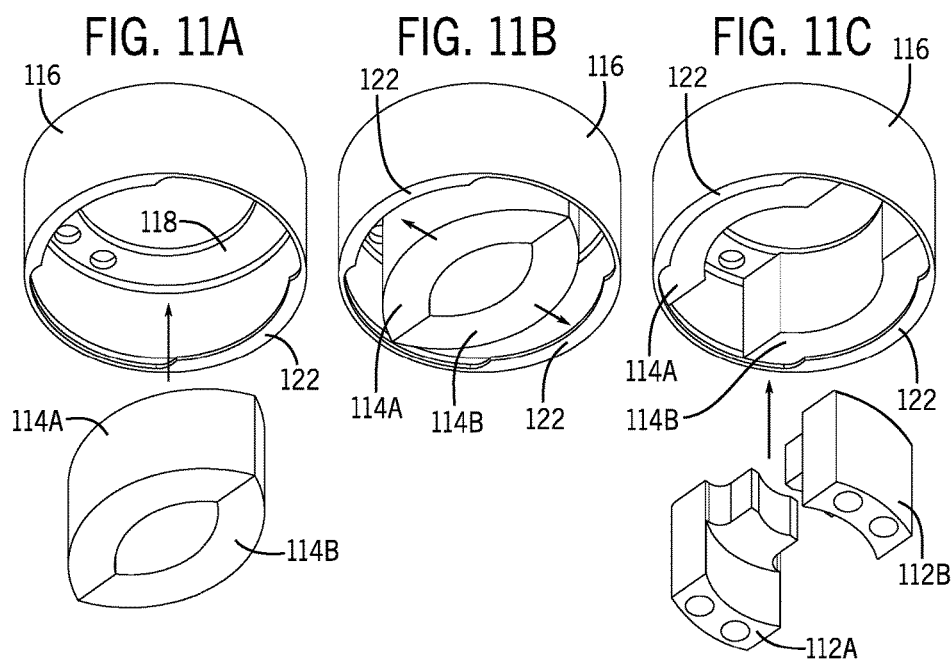
FIGS. 11A-11C are perspective views depicting assembly steps for the magnet assembly shown in FIG. 10.

Referring to FIGS. 10 and 11A-11C, the shell 116 is generally a cylindrical or cup-shaped component with an end wall 118 at one axial end that extends radially inward along the entire circumference of the shell 116. At the other axial end, the shell 116 has a pair of radially inwardly extending lips 122, or put another way, this end of the shell 116 has a radial end wall that is notched at one or more locations so that so that the radial dimension at the notches is less than the radial dimension at other portions of the end wall. Either way, the spaces between the lips 122 (or the notches in the end wall) allows clearance for items that have a radial dimension greater than the diametric dimension between the lips 122 (or of the end wall). This permits the magnets 114A, 114B to be inserted into the shell 116 between the lips 122 (or within the notches) from the center (FIG. 11A) and then moved outward toward the cylindrical wall of the shell 116 (FIG. 11B). In this position, the magnets 114A, 114B are captured axially between the lips 122 (or end wall) and the end wall 118. The pole pieces 112A, 112B may then be inserted straight (axially) through the spaces between the lips 122 (or the notches) and into the shell 116. This may be a tight fit (e.g., press fit or interference fit), or looser tolerances may allow for hand assembly, in which case, or in any case, a high temperature potting compound may be applied to any voids or open spaces in the assembly to ensure a tight connection of the pole pieces 112A, 112B and the magnets 114A, 114B. The pole pieces 112A, 112B and magnets 114A, 114B may also be bolted to the shell 116, such as via openings in the pole pieces 112A, 112B and shell 116 as shown.

Referring again to FIGS. 4, 5 and 12, the coil assembly 120 includes a wire coil 124 wound about a bobbin 126 nested within the magnet assembly 110. An annular shunt 128 fits axially between the pole pieces 112A, 112B and the seal plate 104. A seal cup 106 has a cylindrical body that fits about the armature 100 within the central openings of the bobbin 126 and the seal plate 104 and has a flange 108 that is clamped against an underside of the seal plate 104 by the valve housing 62. The bobbin 126 has a pair of support members 130 that extend axially from the wire coil 124 holding portion. In the illustrated example, the support members 130 are in the form of ears or tabs integrally formed in the bobbin 126. However, it should be understood that in other embodiments, the support members may have different configurations and be separate parts that are connected to the bobbin 126. As shown, the support members 130 have threaded openings for bolting the bobbin 126, and thereby the wire coil 124, directly to the heatsink housing 22. This direct mechanical connection, being of thermally conductive material, thus provides a direct thermal conduction path to the heatsink housing 22 for the bobbin 126 to thereby extract heat from the wire coil 124 by way of conduction to the heatsink housing 22, which is thereafter emitted to ambient air by thermal radiation.

Having described the components of the example servo valve 20 in detail, the operation of the torque motor 24 and the valve arrangement 26 will now be described. As will be understood, the magnet assembly 110 produces a set of magnetic flux paths generally normal to the page in FIG. 5 each of which flows from one pole piece to the other. One flux path flows through each magnet 114A, 114B in opposite clock directions and then both pass across the air gap to one end (the upper end in FIG. 5) of the armature 100, through the armature 100 and then across the air gap at the opposite side of the valve axis A. Thus, the magnetic flux paths through the magnets 114A, 114B pass through the armature 100 in the same direction from the pole piece 112B to the pole piece 112A. The coil assembly 120 produces a set of magnetic flux paths generally in the plane of the section shown in FIG. 5 each of which flows from the pole pieces 112A, 112B across the air gap to the upper end of the armature 100 to the lower end. The magnetic flux paths flow across the air gaps to the seal plate 104 and move in opposite directions through the seal plate 104 and the shunt 128 to the associated pole piece 112A, 112B.

The combination of magnetic flux acts to move the armature 100 off of the valve axis A, such as to move the upper end of the armature 100 to the left or right in FIG. 5 (depending on polarity of the current through the wire coil 124), with the magnitude or pivot angle being adjustable by varying the amplitude of the current through the wire coil 124. The armature 100, and thereby the clevis 70, pivot about the pivot axis P. This pivots the head 88 of the clevis 70 between the three positions shown in FIGS. 6A-6C. The 3-way flow control may be set up to default to one of the three positions, in other words so that the servo valve 20 defaults (absent energization of the torque motor 24) to a source open state (FIG. 6A), a vent open state (FIG. 6C), or a neutral state (FIG. 6B), as in the illustrated example.

Figure 6:
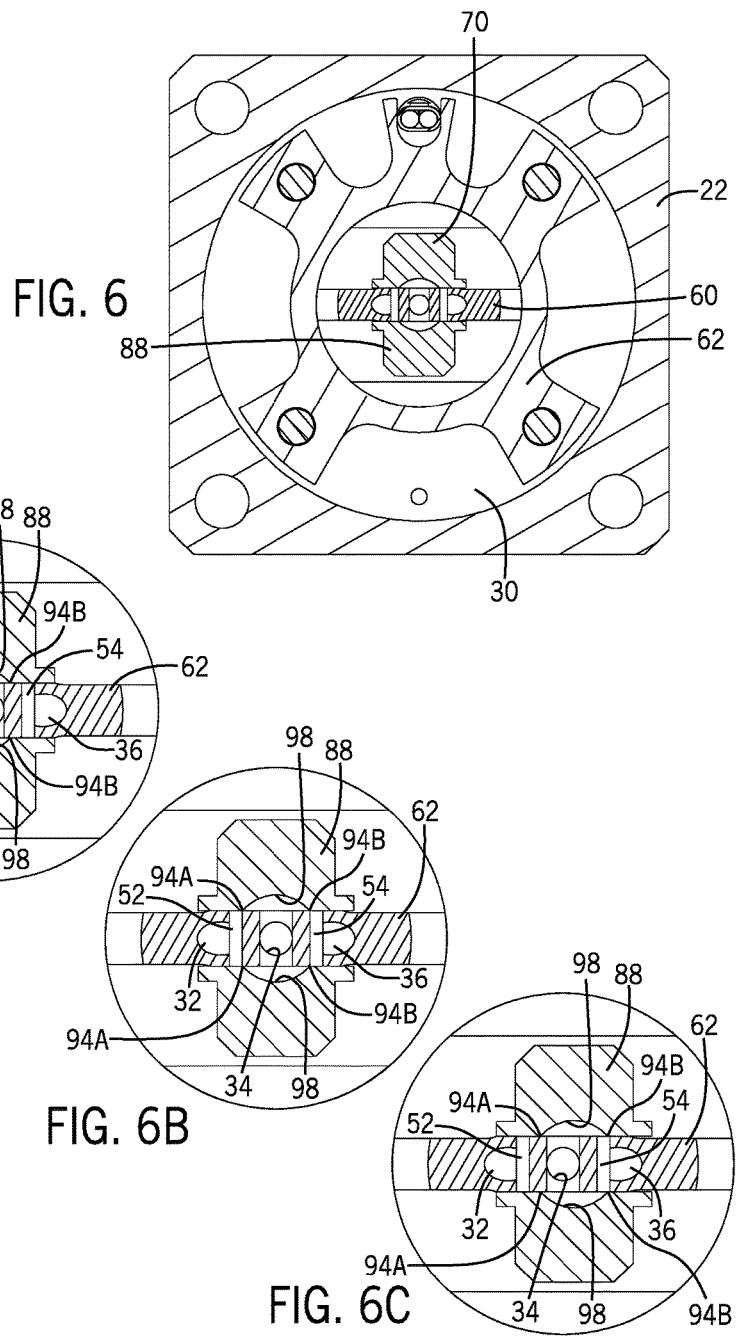
FIG. 6 is a sectional view taken along plane 6-6 of FIG. 5.

As mentioned, the valve arrangement 26 is designed to contain the circulating flow to a zone at or near the valve seat interface, which is intentionally located remote from the torque motor 24, and the coil assembly 120 in particular. The flow is contained in large part by the clevis 70, and in particular the head 88 thereof. Close tolerances as described above can shut off (or substantially shut off) the circuit from the source flow passage 32 to the control flow passage 34, both in the neutral position of the clevis 70 (FIG. 6B) and the vent position (FIG. 6C). Energizing the coil assembly 120 with either a positive or a negative current will move the armature 100 off axis and pivot the clevis 70 to move into either the source or vent position. In the source position shown in FIG. 6A, the source flow passage 32 communicates with the control flow passage 34 via the ports 52 in the valve seat 60, the grooves 98 in the opposing sections of the head 88 of the clevis 70, and the openings 50 in the valve seat 60. The amount of controlled flow will vary depending on the pivotal position of the clevis 70 as determined by the energization of the coil assembly 120. In the vent position shown in FIG. 6C, the vent flow passage 36 communicates with the control flow passage 34 via (and flowing in the reverse direction as the source flow) the openings 50 in the valve seat 60, the grooves 98 in the sections of the head 88 of the clevis 70, and the ports 54 in the valve seat 60. Similarly, the amount of vent flow will vary depending on the pivotal position of the clevis 70 as determined by the energization of the coil assembly 120. In this way, most all (indeed at least a majority) of the circulating flow path in either the source or vent directions is contained to a small, finite region. Any relatively small flow that may leak past the clevis 70 will pass into the cavity of the valve housing 62, in particular the neck 66 and pockets 68A, 68B, with one or more of these areas (especially the upper pocket 68B) acting as a deadhead chamber due to static pressure buildup, which inhibits circulation of the controlled flow therein, and thereby minimizes convective heat transfer beyond the interface of the valve seat 60.

Accordingly, the servo valve 20 mitigates heat transfer from the controlled flow in a coordinated, multi-front manner. As just explained, the circulating controlled flow is contained to a short flow path substantially confined by the valve seat 60 and the clevis 70 in a zone near one end of the servo valve 20 that is opposite the coil assembly 120. Static pressure within the valve housing 62 surrounds the controlled flow path to inhibit circulation beyond the confined area at the interface of the valve seat 60. The components of the valve arrangement 26 are made of materials that are relatively poor conductors to limit thermal conduction from any stagnated leakage of the controlled flow beyond the confined area of the valve seat 60. The coil assembly 120 is isolated by an air gap from components (e.g., the seal plate 104) that are in contact with the valve housing 62 and may have been heated by conduction. Finally, a direct conduction path is provided, using highly conductive materials, from the wire coil 124 to the heatsink housing 22, which is designed to promote efficient emission of radiant thermal energy. In short, using a strategy of heat containment, low internal heat conduction, and efficient heat extraction, the servo valve 20 has a stratified thermal profile in which source-level temperatures may exist at the base of the servo valve 20 but much lower temperatures exist at the upper end where the torque motor 24 resides. Moreover, it should be noted that using materials with the same or similar thermal characteristics (e.g., coefficient of thermal expansion) for the components of the valve arrangement 26, in particular the valve seat 60 and the clevis 70, reduces the likelihood of leakage (and thereby migrating heat) as well as binding or other interference with movement of the clevis 70.

By way of a non-limiting example, the servo valve 20 is capable of handling flow at steady-state temperatures of about 300-400° F. and transient temperatures of about 750-1,000° F. Further, the servo valve 20 is capable of operation at about 7.4 CFM, 3-4% hysteresis at 6.4 to 7.4 CFM with 190 PSIG inlet within an effective area turn down ratio of 2.5%, and vibration frequency/amplitude handling of about 100 GRMS from 10-2000 Hz. In the disclosed example, the valve arrangement 26 (i.e., the base 30, the valve housing 62, clevis 70 and flexure pivot 72) is a martensitic stainless steel (e.g., 13-8 stainless). The assembly thus exhibits low CTE and exhibits a low thermal conductivity (e.g., less than 10 BTU/(Hr-Ft-° F.)). In contrast, the heatsink housing 22 and the bobbin 126 may be aluminum having a significantly higher thermal conductivity value on the order of ten or more times that of the valve arrangement 26.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:
1. A servo valve, comprising:
 a heatsink housing having a plurality of external fins and defining an internal chamber;
 an electromagnet arrangement disposed within the internal chamber and generating a flux field, the electromagnet arrangement having a magnet assembly, a coil assembly with a wire coil wound about a bobbin, and an armature acted upon by the flux field;
 a seal plate disposed within the internal chamber;
 a conductive support member directly connecting the bobbin of the coil assembly to the heatsink housing; and
 a valve arrangement disposed within the internal chamber at a side of the seal plate opposite the electromagnet arrangement and having a valve member driven by the armature to control flow between an inlet port and an outlet port wherein the coil assembly is held by the support member in an axially spaced relation with respect to the seal plate.

2. The servo valve of claim 1, wherein the valve arrangement has a lower thermal conductivity than the support member.

3. The servo valve of claim 1, wherein the support member extends from the bobbin and connects to the heatsink housing by mechanical fasteners.

4. The servo valve of claim 3, wherein the bobbin creates a thermal conduction path from the wire coil to the heatsink housing via the support member.

5. The servo valve of claim 4, wherein the bobbin is aluminum.

6. The servo valve of claim 1, wherein the plurality of fins of the heatsink housing define a plurality of emissive surfaces at ninety degrees to one another providing unobstructed thermal emission to ambient.

7. The servo valve of claim 1, wherein the electromagnet arrangement includes a shell in which the magnet assembly is mounted.

8. The servo valve of claim 7, wherein the shell has a hollow cylindrical body extending axially between first and second ends having radially inward extending surfaces, at least the first end having multiple circumferentially spaced radially inward extending surfaces.

9. The servo valve of claim 1, wherein the valve member interfaces with a valve seat defined by a base disposed at an end of the heatsink housing opposite to where the support member connects.

10. The servo valve of claim 9, wherein a majority of flow occurs along a flow path that extends only at the interface between the valve member and the valve seat.

11. The servo valve of claim 1, wherein the valve member is a clevis.

12. The servo valve of claim 11, wherein the valve arrangement includes a flexure pivot in which the clevis is mounted;

wherein the electromagnet arrangement drives the armature to pivot the clevis about the flexure pivot to open the inlet port to the outlet port.

13. The servo valve of claim 12, wherein the clevis defines a metering edge on each side of a flow channel within the clevis which forms a part of a flow path between the inlet port and the outlet port.

14. A servo valve, comprising:

a heatsink housing having a plurality of external fins and defining an internal chamber;

an electromagnet arrangement disposed within the internal chamber and generating a flux field, the electromagnet arrangement having a magnet assembly, a coil assembly with a wire coil wound about a bobbin, and an armature acted upon by the flux field;

a seal plate disposed within the internal;

a valve arrangement disposed within the internal chamber at a side of the seal plate opposite the electromagnet arrangement and having a valve member driven by the armature to control flow between an inlet port and an outlet port; and a support member directly connecting the bobbin of the coil assembly to the heatsink housing to hold the bobbin in an axially spaced relation with respect to the seal plate.

15. The servo valve of claim 14, wherein the support member extends from the bobbin and the bobbin creates a thermal conduction path from the wire coil to the heatsink housing via the support member.

16. The servo valve of claim 14, wherein the valve member interfaces with a valve seat defined by a base disposed at an end of the heatsink housing opposite to where the support member connects; and wherein a majority of flow occurs along a flow path that extends only at the interface between the valve member and the valve seat.

17. A servo valve, comprising:

a heatsink housing having a plurality of external fins and defining an internal chamber;

an electromagnet arrangement disposed within the internal chamber and generating a flux field, the electromagnet arrangement having a magnet assembly, a coil assembly with a wire coil wound about a bobbin, and an armature acted upon by the flux field;

a seal plate disposed within the internal chamber;

a conductive support member directly connecting the bobbin of the coil assembly to the heatsink housing; and a valve arrangement disposed within the internal chamber and having a valve member driven by the armature to control flow between an inlet port and an outlet port at an interface between the valve member and a valve seat defined by a base disposed at an end of the heatsink housing opposite to where the support member connects, wherein the valve member is configured to contain a majority of the flow at the interface between the valve member and the valve seat;

wherein the coil assembly is held by the support member in an axially spaced relation with respect to the seal plate.

18. The servo valve of claim 17, wherein the support member extends from the bobbin and the bobbin creates a thermal conduction path from the wire coil to the heatsink housing via the support member.

19. The servo valve of claim 17, wherein the valve arrangement has a lower thermal conductivity than the support member.

* * * * *